United States Patent
Ichikawa

(10) Patent No.: US 11,046,236 B2
(45) Date of Patent: Jun. 29, 2021

(54) VEHICLE LAMP COMPRISING A CONTROLLER PROGRAMMED TO CONTROL A SWIVEL ACTUATOR TO SWIVEL A SPOT BEAM

(71) Applicant: Koito Manufacturing Co., Ltd., Tokyo (JP)

(72) Inventor: Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 58 days.

(21) Appl. No.: 15/215,980

(22) Filed: Jul. 21, 2016

(65) Prior Publication Data

US 2017/0036593 A1 Feb. 9, 2017

(30) Foreign Application Priority Data

Aug. 7, 2015 (JP) .............................. JP2015-157578

(51) Int. Cl.
*B60Q 1/12* (2006.01)
*B60Q 1/14* (2006.01)
(Continued)

(52) U.S. Cl.
CPC ........... *B60Q 1/122* (2013.01); *B60Q 1/0076* (2013.01); *B60Q 1/0094* (2013.01); *B60Q 1/085* (2013.01);
(Continued)

(58) Field of Classification Search
CPC ......... B60Q 2300/056; B60Q 2300/42; B60Q 1/143; B60Q 2300/112; B60Q 2300/122; B60Q 1/085; B60Q 2300/41; B60Q 2300/45; B60Q 1/12; B60Q 1/1423; B60Q 2300/32; B60Q 1/122; B60Q 1/0076; B60Q 1/0094; B60Q 1/1407; B60Q 2300/054;
(Continued)

(56) References Cited

U.S. PATENT DOCUMENTS 7,503,677 B2 *  3/2009  Morishita .............. B60Q 1/122
                                                    362/319
9,162,611 B2 * 10/2015  Kay ........................ B60Q 1/12
(Continued)

FOREIGN PATENT DOCUMENTS

CN    103097196 A    5/2013
EP      1669665 A    6/2006
(Continued)

OTHER PUBLICATIONS

A France Preliminary Search Report dated Feb. 27, 2018, issued from the Institut National De La Proprite Industerielle (INPI) of France Patent Application No. 1657509.
(Continued)

*Primary Examiner* — Borna Alaeddini
(74) *Attorney, Agent, or Firm* — Abelman, Frayne & Schwab

(57) ABSTRACT

The light source of the present disclosure spot-irradiates a distant place in front of a vehicle. The turn on/off circuit supplies a driving current $I_{LD}$ to the light source 120 to turn on the light source. The swivel mechanism swivels the light source. The turn on/off circuit reduces a light quantity of the light source as a swivel angle θ of the swivel mechanism is large.

7 Claims, 6 Drawing Sheets

(51) Int. Cl.
*B60Q 1/00* (2006.01)
*B60Q 1/08* (2006.01)

(52) U.S. Cl.
CPC ............. *B60Q 1/12* (2013.01); *B60Q 1/143* (2013.01); *B60Q 1/1407* (2013.01); *B60Q 2300/054* (2013.01); *B60Q 2300/056* (2013.01); *B60Q 2300/112* (2013.01); *B60Q 2300/122* (2013.01); *B60Q 2300/322* (2013.01); *B60Q 2300/42* (2013.01)

(58) Field of Classification Search
CPC ... B60Q 2300/322; B60Q 1/407; F21S 41/14; F21S 41/141; F21S 41/20; F21W 2102/00; F21W 2107/10; F21V 23/04; H05B 45/10; H05B 47/10
See application file for complete search history.

(56) References Cited

U.S. PATENT DOCUMENTS

| | | |
|---|---|---|
| 2004/0114379 A1 | 6/2004 | Miller et al. |
| 2004/0179367 A1* | 9/2004 | Takeda ..................... B60Q 1/04 362/466 |
| 2005/0135081 A1* | 6/2005 | Ishiguro ................... B60Q 1/12 362/37 |
| 2005/0180139 A1* | 8/2005 | Takeda ..................... B60Q 1/12 362/276 |
| 2006/0028832 A1* | 2/2006 | Horii ........................ B60Q 1/12 362/514 |
| 2007/0024200 A1* | 2/2007 | Morishita ............. B60Q 1/122 315/82 |
| 2008/0239734 A1* | 10/2008 | Ibrahim ................... B60Q 1/12 362/460 |
| 2010/0080009 A1* | 4/2010 | Yamazaki ................ B60Q 1/12 362/465 |
| 2010/0134011 A1* | 6/2010 | Kobayashi ............ B60Q 1/085 315/82 |
| 2014/0029289 A1* | 1/2014 | Mochizuki ........... F21S 41/698 362/525 |
| 2014/0084788 A1* | 3/2014 | Kim ....................... B60Q 1/143 315/79 |
| 2014/0175978 A1* | 6/2014 | Kobayashi ........... F21S 48/1195 315/82 |
| 2014/0184076 A1* | 7/2014 | Murphy ............. H05B 33/0824 315/121 |
| 2016/0069527 A1* | 3/2016 | Komatsu ................ B60Q 1/143 362/512 |

FOREIGN PATENT DOCUMENTS

| | | | |
|---|---|---|---|
| EP | 2484557 A2 * | 8/2012 | ............... B60Q 1/12 |
| FR | 2824513 A1 | 11/2002 | |
| JP | 2000-198385 A | 7/2000 | |
| JP | 2002-225624 A | 8/2002 | |
| JP | 2003-72460 A | 3/2003 | |
| JP | 2004-200056 A | 7/2004 | |
| JP | 2009-083835 A | 4/2009 | |
| WO | 2014/136887 A | 9/2014 | |
| WO | WO-2015170403 A1 * | 11/2015 | ............... B60Q 1/14 |

OTHER PUBLICATIONS

An Office Action dated May 25, 2018, issued from the Chinese State Intellectual Property Office of the P.R.C (SIPO) of Chinese Patent Application No. 201610483970.0 and an EN translation thereof.
An Office Action dated Apr. 23, 2020, issued from the Japanese Patent Office (JPO) of Japanese Patent Application No. 2015-157578 and a Machine translation thereof. (6 pages).

\* cited by examiner

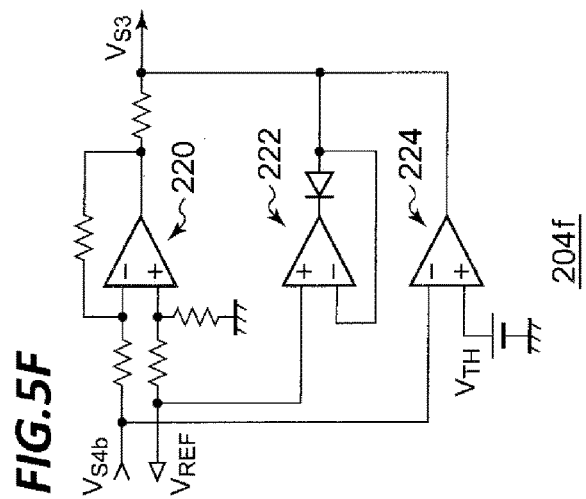
*FIG.5A*  *FIG.5B*  *FIG.5C*
*FIG.5D*  *FIG.5E*  *FIG.5F*

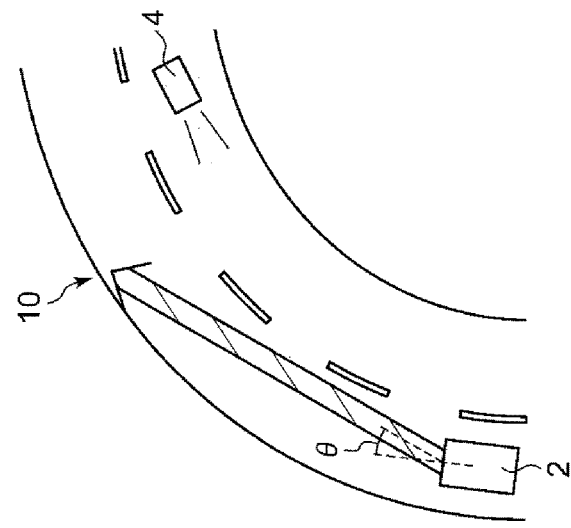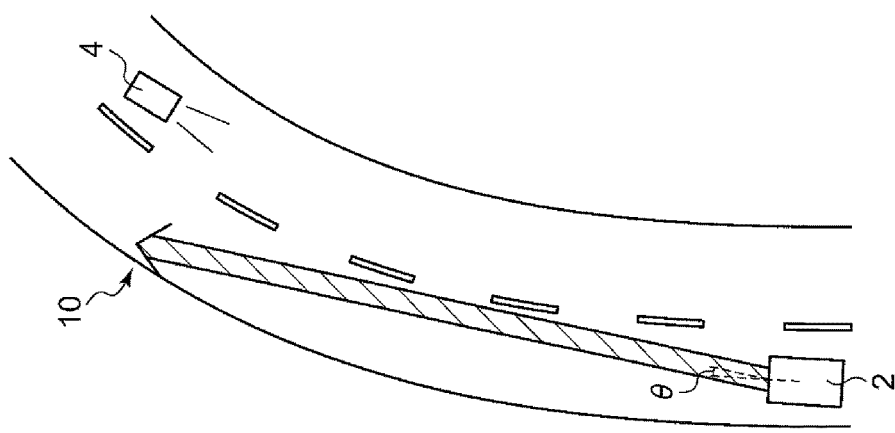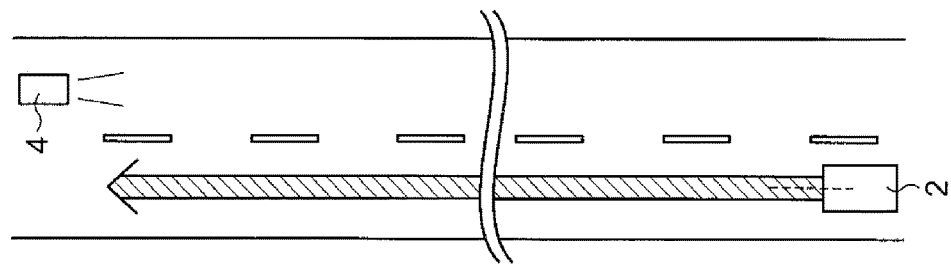

VEHICLE LAMP COMPRISING A CONTROLLER PROGRAMMED TO CONTROL A SWIVEL ACTUATOR TO SWIVEL A SPOT BEAM

CROSS-REFERENCE TO RELATED APPLICATIONS

This application is based on and claims priority from Japanese Patent Application No. 2015-157578 filed on Aug. 7, 2015, with the Japan Patent Office, the disclosure of which is incorporated herein in its entirety by reference.

TECHNICAL FIELD

The present disclosure relates to a vehicle lamp used for an automobile or the like.

BACKGROUND

As a light source of a conventional vehicle lamp, especially, a headlamp, a halogen lamp or a high intensity discharge (HID) lamp has been widely used. However, instead of these lamps, a vehicle lamp using a semiconductor light source such as, for example, a light emission diode (LED) or a laser diode (also called a semiconductor laser) has been recently developed.

In order to improve distant place visibility, a vehicle lamp provided with a lamp spot-irradiating a more distant place (which is referred to as an "additional high beam") than that irradiated by a common high beam has been developed. Since a light source of the additional high beam requires high directivity, a laser diode or a high luminance semiconductor light source similar to the laser diode is used. In addition, the high luminance light source such as, for example, a laser diode or a LED may also be used for a common high or low beam.

SUMMARY

Since the additional high beam provides a spot light distribution, it is expected to further improve the distant place visibility on a curved road by swiveling a beam axis to left and right directions depending on an extent of the curve. The inventors of the present disclosure studied the additional high beam light source having the swiveling function, and as a result, came to recognize the following problems.

FIG. 1 is a view illustrating a vehicle which is driving on a curved road. When an own vehicle 2 drives on a curved road 6 illustrated in FIG. 1, a beam axis of the additional high beam becomes inclined to the visual line direction of a driver, i.e., to the right direction. The additional high beam may cause a glare to a preceding or oncoming vehicle (which is collectively referred to as a "forward vehicle"). Thus, when a forward vehicle is detected by, for example, a camera, the additional high beam is turned off or dimmed.

The curved road 6 is a so-called blind curve. The oncoming vehicle 4 drives in a range 8 that is not seen from the own vehicle 2, and suddenly appears in the irradiation range of the additional high beam of the own vehicle 2, moreover, in a position close to the light source. Since a delay exists until the additional high beam is turned off (dimmed) after the camera of the own vehicle 2 recognizes the oncoming vehicle 4, a strong glare may be caused to the oncoming vehicle 4 in the occasion of FIG. 1.

In addition, on a curved road with a small curvature radius R, for example, a guardrail or a wall placed in the beam axis direction becomes an irradiation target 10. As the curvature radius R is small, the distance between the own vehicle 2 and the irradiation target 10 becomes close. Accordingly, the driver of the own vehicle 2 is exposed to a glare caused by the reflected beam from the irradiation target 10.

The present disclosure has been made in consideration of the circumstance, and an exemplary object of an aspect of the present disclosure is to provide a vehicle lamp in which a glare to a forward or own vehicle can be suppressed.

An aspect of the present disclosure relates to a vehicle lamp. The vehicle lamp includes a lamp unit that generates a spot beam to spot-irradiate a distant place, a turn on/off circuit that turns on a light source provided in the lamp unit, and a swivel mechanism that swivels the spot beam. The turn on/off circuit reduces a light quantity of the light source as a swivel angle of the spot beam is large.

According to this aspect, a glare to a forward or own vehicle may be suppressed at the time of driving on a curved road.

The turn on/off circuit may turn off the light source when the swivel angle exceeds a predetermined threshold value.

When a target light quantity is updated according to a variation of the swivel angle, the turn on/off circuit may gradually change the light quantity of the light source to reach the updated target quantity. As a result, a brightness of a visual field may be suppressed from being rapidly changed, for example, when the wheel is abruptly turned, so that safety may be enhanced.

Another aspect of the present disclosure also provides a vehicle lamp. The vehicle lamp includes a lamp unit that generates a spot beam to spot-irradiate a distant place, a turn on/off circuit that turns on a light source provided in the lamp unit, and a swivel mechanism that swivels the spot beam. The turn on/off circuit reduces a light quantity of a light source as a curvature radius of a curved road is small.

According to this aspect, a glare to a forward or own vehicle may be suppressed at the time of driving on a curved road.

With the vehicle lamp according to the present disclosure, a glare may be suppressed.

The above-described summary is illustration purposes only and does not intend to limit in any ways. In addition to the illustrative embodiment, examples, and features described above, additional embodiment, example, and features will become apparent by referring to the drawings and the following detailed description.

BRIEF DESCRIPTION OF THE DRAWINGS

FIGS. 5A to 5F are circuit diagrams illustrating an exemplary configuration of a controller.

FIGS. 6A to 6C are views schematically illustrating a relationship between a light quantity and a curvature radius.

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

In the descriptions herein, a "state in which a member A is connected to a member B" means a case where the members A and B are electrically connected to each other without substantially affecting to each other or damaging a function or effect achieved by a combination of the members A and B, or a case where the members A and B are indirectly connected to each other through another member, in addition to a case where the members A and B are physically directly connected to each other.

Likewise, a "state in which a member C is provided between a member A and a member B" means a case where the members A and C or the members B and C are electrically connected to each other without substantially affecting to each other or damaging a function or effect achieved by a connection of the members A and C or the members B and C, or a case where the members A and C or the members B and C are connected to each other through another member, in addition to a case where the members A and C or the members B and C are directly connected to each other.

Figure 1:
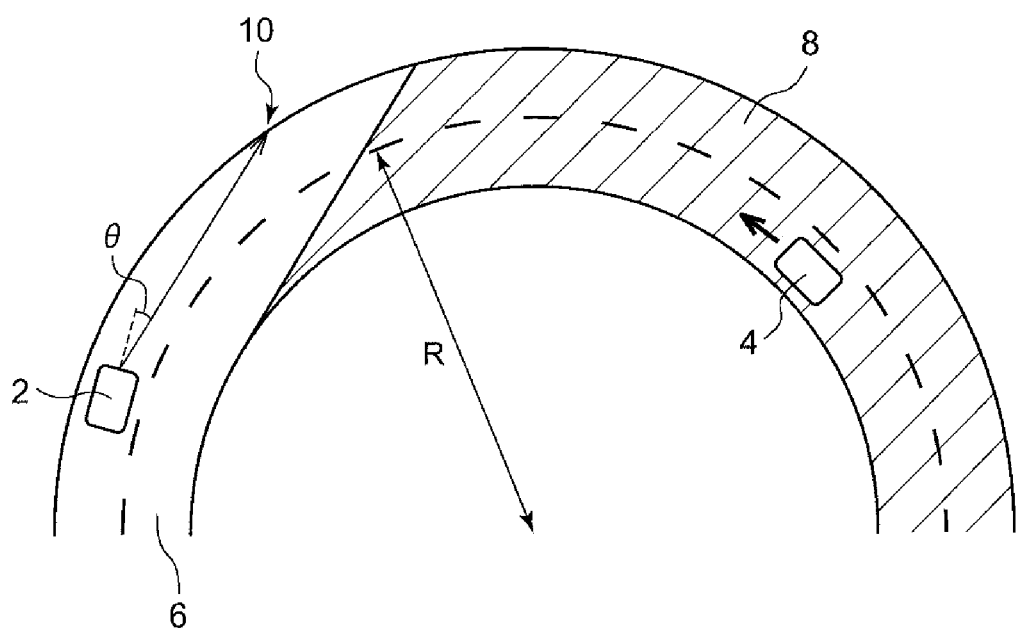
FIG. 1 is a view illustrating a vehicle which is driving on a curved road.
Figure 2A:
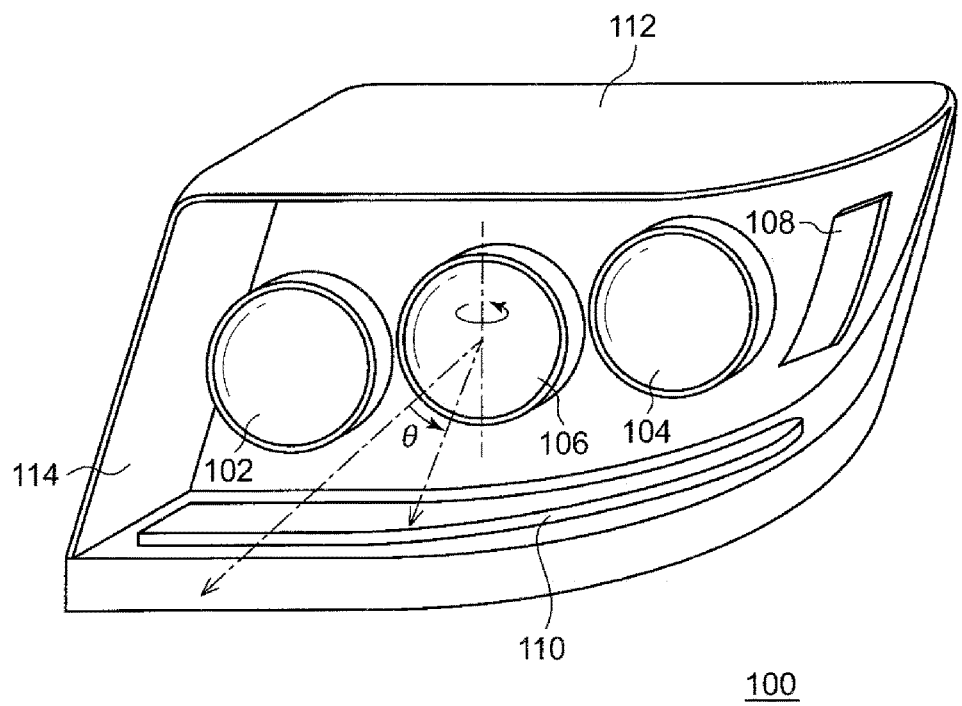
FIGS. 2A and 2B are perspective views of a vehicle lamp according to an exemplary embodiment.
Figure 2B:
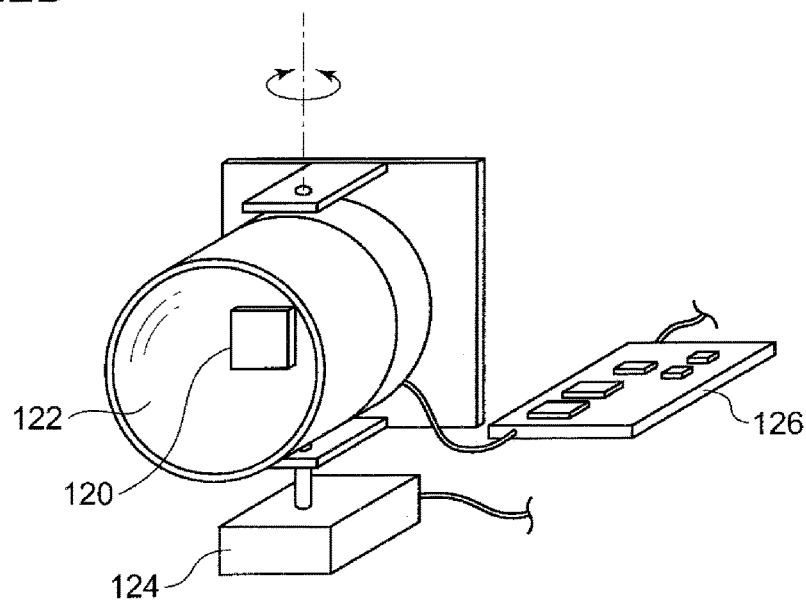

FIGS. 2A and 2B are perspective views of a vehicle lamp 100 according to an exemplary embodiment. FIG. 2A represents the appearance of the vehicle lamp 100. The vehicle lamp 100 includes a low beam unit 102, a high beam unit 104, an additional high beam unit 106, a turn signal lamp unit 108, a clearance lamp 110, and a lamp body 112 accommodating these components, and a cover 114. Arrangement or design of the respective lamp units is different depending on a vehicle model and is not specifically limited.

The additional high beam unit 106 is a lamp configured to spot-irradiate a more distant place than that irradiated by the common high beam unit 104 in order to improve the distant place visibility. Each of the units includes, for example, a light source, an optical system, and a turn on/off circuit, and receives a power supplied from a battery of the vehicle side such that turn-on/off or a light quantity is controlled based on a command from an electronic control unit (ECU) of the vehicle side. In the present exemplary embodiment, the additional high beam unit 106 is configured to swivel the beam axis to left and right directions depending on an extent of a curve. Thus, the distant place visibility on a curved road is expected to be improved.

FIG. 2B is a perspective view illustrating the additional high beam unit 106. The additional high beam unit 106 includes a light source 120, an optical system 122, a swivel mechanism 124, and a turn on/off circuit 126. The light source 120 is a high luminance semiconductor light source, and may be, for example, a combination of a laser diode and a phosphor. Alternatively, the light source 120 may be a white LED or a combination of red, green, and blue LEDs. The optical system 122 includes, for example, a lens or a reflector and is configured to form an appropriate spot light distribution in a distant place.

The swivel mechanism 124 includes, for example, an actuator and a driving circuit thereof. The swivel mechanism 124 swivels the beam axis of the additional high beam unit 106 to the left and right directions based on a command from the ECU of the vehicle side. The turn on/off circuit 126 supplies a driving current to cause the light source 120 to emit light with a desired luminance.

Figure 3:
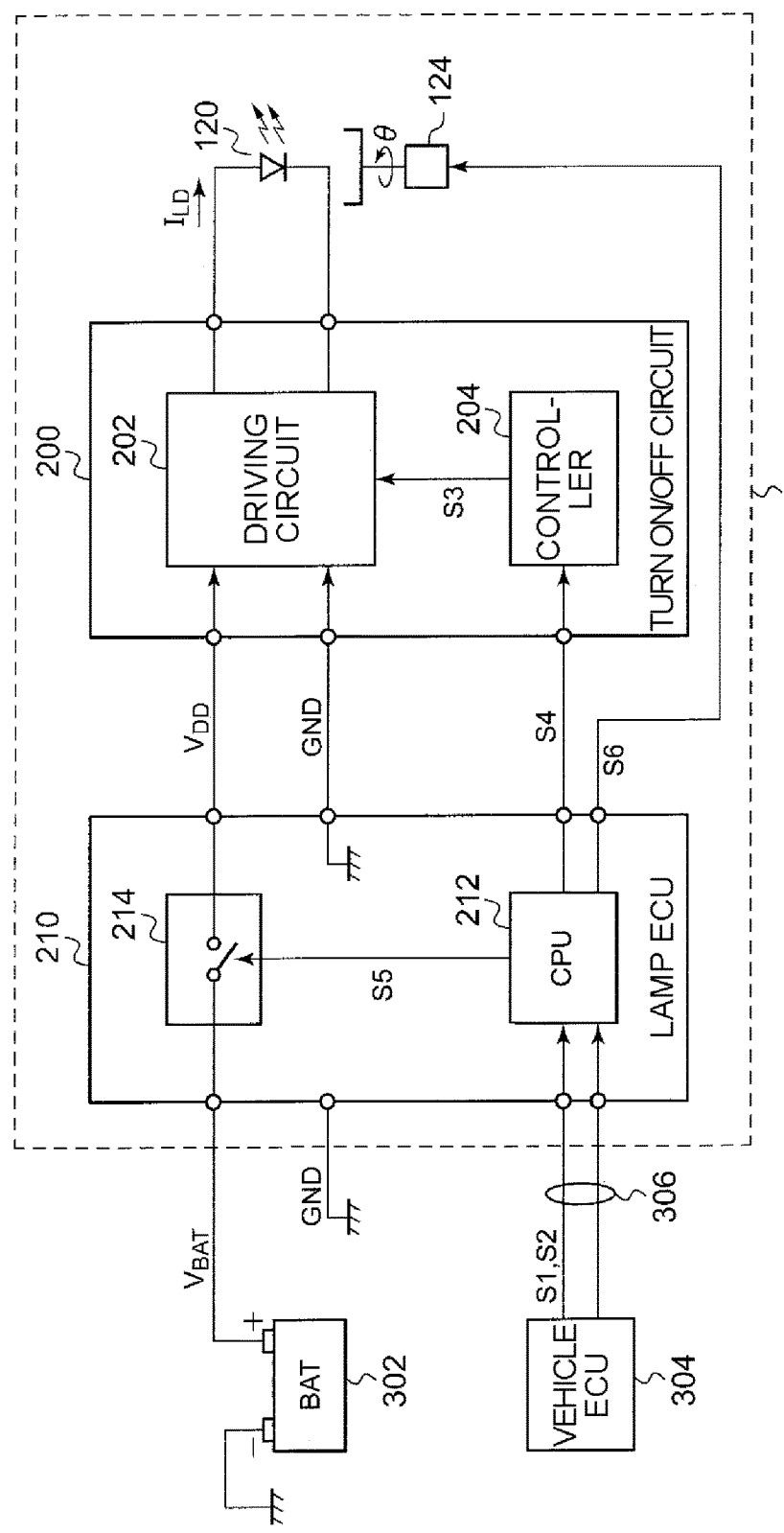
FIG. 3 is a block diagram of a lamp system provided with the vehicle lamp according to the exemplary embodiment.

FIG. 3 is a block diagram of a lamp system 300 provided with the vehicle lamp 100 according to the exemplary embodiment. The lamp system 300 includes a battery 302, a vehicle ECU 304, and a vehicle lamp 100. Although a vehicle is provided with a pair of left and right vehicle lamps 100, FIG. 3 illustrates only one side of the vehicle lamps.

The vehicle ECU 304 is connected to the vehicle lamp 100 through a control line such as, for example, a controller area network (CAN) bus 306, and integrally controls the vehicle lamp 100. For example, a turn on/off command S1 for on/off of a lamp and information (driving information) S2 representing a driving status are transmitted from the vehicle ECU 304 to the vehicle lamp 100.

The vehicle lamp 100 includes a light source 120, a swivel mechanism 124, a turn on/off circuit 200, and a lamp ECU 210. FIG. 3 represents only the configuration of the additional high beam unit 106 in the vehicle lamp 100. As described above, the light source 120 may be a laser diode, but another semiconductor light source having high directivity may be used.

The turn on/off circuit 200 corresponds to the turn on/off circuit 126 of FIG. 2B, and supplies a driving current (a lamp current) $I_{LD}$ to the light source 120 to cause the light source 120 to emit light. The turn on/off circuit 200 includes a driving circuit 202 and a controller 204. The driving circuit 202 receives a light control signal S3 from the controller 204 and supplies a driving current (a lamp current) $I_{LD}$ according to the light control signal S3 to the light source 120. What is preferably used as the driving circuit 202 is a constant current converter which not only supplies a power supply voltage $V_{DD}$ to the light source 120 by boosting or dropping the voltage but also stabilizes the driving current $I_{LD}$ flowing in the light source 120 to be a target current according to the light control signal S3. In addition, a topology of the constant current converter is not specifically limited. The driving circuit 202 may perform together an analogue light control, which controls a current amount of the driving circuit $I_{LD}$, and a pulse width modulation (PWM) light control, which switches the driving circuit $I_{LD}$ at a high speed so as to change a duty ratio thereof, or may perform only one of the controls. The light control signal S3 may include a signal S3a for controlling the analogue light control and a signal S3b for controlling the PWM light control.

The controller 204 generates the light control signal S3 according to a control signal S4 from the lamp ECU 210. The control signal S4 will be described later.

The lamp ECU 210 includes a central processing unit (CPU) 212 and a semiconductor switch 214. The CPU 212 generates the control signal S4 to control the light source 120, according to the turn on/off command S1 and the driving information S2 from the vehicle ECU 304. The control signal S4 may include data S4a that instructs on/off of the light source 120, and information S4b that directly or indirectly instructs the light quantity of the light source 120.

The driving information S2 includes, for example, presence/absence of a forward vehicle, a vehicle speed, and a steering angle. When the turn on/off command S1 instructs turn-on, and presence/absence of a forward vehicle, a vehicle speed, and a steering angle meet a predetermined condition, the lamp ECU 210 causes the data S4a to be in a turn-on level. The driving information S2 may further include, for example, information (pitch, roll, and yaw) from an acceleration sensor or a gyro sensor, and information of opening/closing of a door.

The semiconductor switch 214 is provided on a power supply line between the battery 302 and the driving circuit 202, and on/off of the semiconductor switch 214 is controlled according to the control signal S5 from the CPU 212.

The semiconductor switch 214 becomes "on" in the turned-on state of the light source 120.

In addition, the CPU 212 generates a swivel control signal S6 based on the driving information S2 to control a swivel angle of the swivel mechanism 124. The CPU 212 detects a curved road based on steering angle information, car navigation information, and camera information included in the driving information S2 or determines a swivel angle θ based on combinations of the information. The swivel mechanism 124 swivels the light source 120 by a swivel angle θ instructed by the swivel control signal S6.

The light quantity of the light source 120 is the largest at the time of driving on a straight road, and therefore, takes the largest value when θ=0°. The turn on/off circuit 200 reduces the light quantity of the light source 120, in other words, lowers the driving current $I_{LD}$ as the swivel angle θ of the swivel mechanism 124 is large. FIGS. 4A to 4F are views illustrating a relationship between the swivel angle θ and the light quantity.

Figures 4A, 4B, 4C:
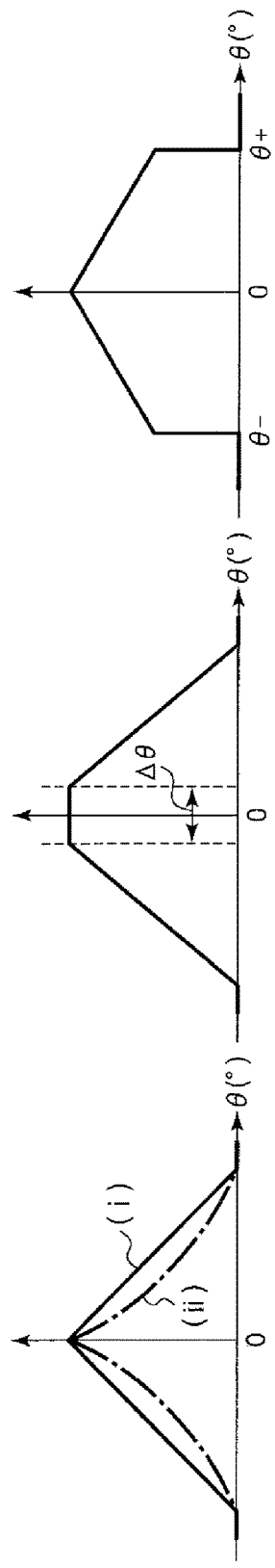
FIGS. 4A to 4F are views illustrating a relationship between a swivel angle θ and a light quantity.

In FIG. 4A, the light quantity decreases linearly with respect to the swivel angle θ (i). For example, a positive swivel angle θ corresponds to swivel to the right direction, and a negative swivel angle θ corresponds to swivel to the left direction. The light quantity may be horizontally symmetrical or asymmetrical with respect to the swivel angle θ=0°.

Alternatively, the light quantity may decrease in a downwardly convex curve form with respect to the swivel angle θ (ii). The downwardly convex curve may be a function of, for example, y=1/x or y=e−x. Since human being's eyes are difficult to be aware of a light variation as light is bright, a natural brightness variation for a human being may be implemented by increasing the light variation when the light quantity is high and decreasing the light variation when the light quantity is low.

In FIG. 4B, when the swivel angle θ is included in a predetermined range Δθ near 0°, light is emitted in the same light quantity as that for the straight road (θ=0°), and when the swivel angle θ is beyond the range, the light quantity decreases.

Figures 4D, 4E, 4F:
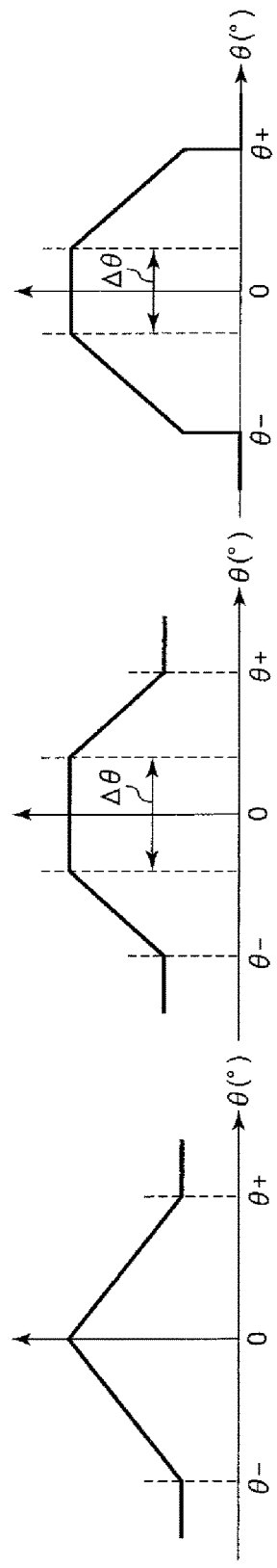

In FIG. 4C, when the swivel angle θ is beyond a predetermined range (θ− to θ+), the light quantity becomes zero (0), that is, light is turned off. In FIG. 4D, when the swivel angle θ is beyond a predetermined range (θ− to θ+), the light quantity is clamped at a predetermined lower limit value.

It is understood that FIG. 4E is a combination of FIGS. 4B and 4D. It is understood that FIG. 4F is a combination of FIGS. 4B and 4C. In addition, the slope portions of FIGS. 4B to 4F may be replaced with downwardly convex curves as in (ii) of FIG. 4A.

The light quantity control based on the swivel angle may be performed in (1) the vehicle lamp 100 or (2) the vehicle ECU 304 as described below. When being performed in the vehicle lamp 100, the light quantity control may be performed in (1A) the CPU 212 or (1B) the controller 204. Hereinafter, each of the cases will be described.

(1A) Control by CPU 212

The driving information S2 that includes at least one of a steering angle, navigation information, camera information, and a curvature radius R of a curved road is input into the CPU 212 from the vehicle ECU 304. The CPU 212 determines a swivel angle θ based on the driving information S2, and outputs a swivel control signal S6 to the swivel mechanism 124. In addition, in the CPU 212, an arithmetic equation indicating the relationship between the swivel angle θ and the light quantity is defined. Based on the arithmetic equation, the CPU 212 determines the light quantity and generates light quantity information S4b to instruct the light quantity. The turn on/off circuit 200 turns on the light source 120 based on the light quantity information S4b.

Alternatively, in the CPU 212, a table indicating the relationship between the swivel angle θ and the light quantity may be prepared to determine the light quantity with reference to the table. Since the light quantity control in the CPU 212 may use the arithmetic equation or table, the relationship between the swivel angle and the light quantity may be flexibly defined.

Otherwise, the swivel angle θ may be determined by the vehicle ECU 304. In this case, the control signal S4 may include data indicating the swivel angle θ, and the CPU 212 may determine the light quantity based on the data.

(1B) Control by Controller 204

As described above, the swivel angle θ is determined by the CPU 212 or the vehicle ECU 304. The CPU 212 outputs information indicating the swivel angle θ (the swivel angle information S4b) to the turn on/off circuit 200. The swivel angle information S4b may be digital data or an analogue signal.

The controller 204 determines the light quantity based on the swivel angle information S4b. In order to obtain the determined light quantity, the controller 204 controls the driving current $I_{LD}$ through any one of the PWM light control and the analogue light control, or a combination thereof.

When the controller 204 includes, for example, a CPU or a digital arithmetic processing circuit, the light quantity may be determined in the same manner as used in the CPU 212 of (1A).

The controller 204 may be also configured by an analogue circuit. FIGS. 5A to 5F are circuit diagrams illustrating an exemplary configuration of the controller 204. These circuit diagrams illustrate only the configuration corresponding to the range of θ>0°. An analogue voltage $V_{S4b}$ may be a signal indicating an absolute value of the swivel angle.

The analogue voltage $V_{S4b}$ indicating the swivel angle information is input into the controller 204a of FIG. 5A. The controller 204a includes a reverse amplifier 220 that reversely amplifies the analogue voltage $V_{S4b}$ and generates a light control signal $V_{S3}$ of the analogue voltage. The controller 204a of FIG. 5A may implement the control characteristic of FIG. 4A.

The controller 204b of FIG. 5B includes a clamp circuit 222, in addition to the reverse amplifier 220. The clamp circuit 222 clamps the light control signal $V_{S3}$ so as not to exceed a predetermined voltage $V_{REF}$. The predetermined voltage $V_{REF}$ defines a normal lamp current in the straight road (swivel angle θ=0). The controller 204b of FIG. 5A may implement the control characteristic of FIG. 4B.

The controller 204c of FIG. 5C includes a comparator 224, in addition to the reverse amplifier 220. The comparator 224 compares the analogue voltage $V_{S4b}$ with a predetermined threshold voltage $V_{TH}$, and pulls down an output of the analogue voltage $V_{S4b}$ when $V_{S4b}<V_{TH}$. For example, the comparator 224 may include an open collector (open drain) type output stage. The controller 204c of FIG. 5C may implement the control characteristic of FIG. 4C, and the threshold voltage $V_{TH}$ corresponds to $θ_+$.

The controller 204d of FIG. 5D includes a clamp circuit 226, in addition to the reverse amplifier 220. The clamp circuit 226 clamps the light control signal $V_{S3}$ so as not to be lower than a predetermined voltage $V_{MIN}$. The controller 204d of FIG. 5D may implement the control characteristic of FIG. 4D.

The controller 204e of FIG. 5E includes the clamp circuit 222 and the clamp circuit 226, in addition to the reverse amplifier 220. The clamp circuit 222 clamps the light control signal $V_{S3}$ so as not to exceed the predetermined voltage $V_{REF}$. The clamp circuit 226 clamps the light control signal $V_{S3}$ so as not to be lower than the predetermined voltage $V_{MIN}$. The controller 204e of FIG. 5E may implement the control characteristic of FIG. 4E.

The controller 204f of FIG. 5F includes the clamp circuit 222 and the comparator 224, in addition to the reverse amplifier 220. The controller 204f of FIG. 5F may implement the control characteristic of FIG. 4F.

When the wheel is abruptly turned so that the swivel angle θ rapidly varies, the light quantity rapidly fluctuates. Otherwise, in a case of performing the control of FIG. 4C or 4F, when a swivel operation beyond $θ_+$ (or $θ_-$) occurs, the light quantity rapidly fluctuates. Accordingly, the brightness of the visual field rapidly varies, thereby, causing an uncomfortable feeling to a driver. Thus, when the light quantity information S4b is updated according to the swivel operation, the turn on/off circuit 200 gradually changes the light quantity of the light source 120 to reach the updated target light quantity. When a gradual transition time of, for example, 0.1 to 10 seconds, preferably, 0.2 to 5 seconds is provided, a natural light quantity change may be made so that a necessary visual field may be secured while reducing the uncomfortable feeling that may be caused to a driver. The gradual change control may be implemented by adding, to the controller 204, a gradual change circuit causing slow-down of the analogue voltage $V_{S3}$ (the light control signal S3). The gradual change circuit may be a CR integrator (a low pass filter). When the light quantity is controlled by the CPU 212, the gradual change control may be implemented by using a counter or a digital filter provided within the CPU 212. In addition, when a forward vehicle is detected, it is required to immediately turn off the lamp without delay in order to prevent a glare from being caused to the forward vehicle.

The configuration of the vehicle lamp 100 has been described. Subsequently, the operation of the vehicle lamp 100 will be described. FIGS. 6A to 6C are views schematically illustrating a relationship between a light quantity and a curvature radius. FIG. 6A illustrates driving on a straight road, and FIGS. 6B and 6C illustrate driving on a curved road. The size of the light quantity is represented by an extent of hatching. When a vehicle drives on a straight road as in FIG. 6A, the swivel angle θ is 0°, and the place in front of the vehicle is irradiated with maximum luminance. When a vehicle drives on a curved road as in FIG. 6B, the swivel angle θ increases, and the light quantity decreases. When the curvature radius R is further reduced as in FIG. 6C, the swivel angle θ further increases, and the light quantity further decreases.

Comparing FIGS. 6A to 6C with each other, in FIG. 6A, the oncoming vehicle 4 may be detected at the most distant place. FIGS. 6B and 6C represent blind curves, in which as the curvature radius R is small, the detection of the oncoming vehicle 4 is difficult, and the distance between the own vehicle 2 and the oncoming vehicle 4 at the detection time is close. In the vehicle lamp 100 according to the present exemplary embodiment, the light quantity of the light source 120 at the time of the detection of the oncoming vehicle 4 decreases as the swivel angle θ increases, in other words, as the curvature radius R is reduced. Hence, it is possible to suppress a glare from being caused to the oncoming vehicle 4 during the time from the detection of the oncoming vehicle 4 until the light is turned off or dimmed.

Further, as illustrated in FIGS. 6A to 6C, while the distance between the own vehicle 2 and the irradiation target 10 becomes close as the curvature radius R is reduced, the light quantity of the light source 120 decreases as the curvature radius R is reduced. Therefore, it is possible to suppress a glare caused by the reflected light from the irradiation target 10 to the driver of the own vehicle 2.

The present disclosure has been described based on an exemplary embodiment by using specific wordings, but the exemplary embodiment merely represents the principle and the application of the present disclosure. Various modifications or changes in arrangement may be made to the exemplary embodiment without departing from the technical idea of the present disclosure defined in the claims.

(First Modification)

In the exemplary embodiment, the light quantity is controlled based on the swivel angle θ, but the present disclosure is not limited thereto. For example, the turn on/off circuit 200 may control the light quantity of the light source 120 depending on a curvature radius R of a curved road. Specifically, the turn on/off circuit 200 may reduce the light quantity of the light source 120 as the curvature radius R is small. For example, when a control to reflect a vehicle speed to the swivel angle θ is performed, the swivel angle θ may be reduced even during driving on a curved road having a small curvature radius R. Even in this case, when the light quantity of the light source 120 is controlled based on the curvature radius R, the light quantity may be appropriately changed.

(Second Modification)

In the exemplary embodiment, the lamp of which the light source 120 is swiveled by the swivel mechanism has been described, but the present disclosure is not limited thereto. For example, in a lamp which generates a spot beam by reflecting light such as, for example, LED or LD against a reflecting mirror, the reflecting mirror may be swiveled by the swivel mechanism. In addition, the technical idea of the present disclosure may be also applied to a lamp in which a spot beam is not swiveled, and a beam axis is fixed.

(Third Modification)

In the exemplary embodiment, the light source 120 is used for the additional light beam, but the present disclosure is not limited thereto. The light source 120 may be also used for a common high beam light source which irradiates a high beam area. In addition, the light source 120 may be also used for a light source which irradiates at least a part of a high beam area.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a lamp configured to generate a spot beam spot-irradiating a distant place;
   a turn on/off circuit configured to turn on a light source provided in the lamp;
   a swivel actuator configured to swivel the spot beam; and
   a controller programmed to control the swivel actuator to swivel the spot beam by a swivel angle and to control the turn on/off circuit based on the swivel angle alone such that the turn on/off circuit keeps a driving current supplied into the light source constant when the swivel angle of the spot beam is included in a first predetermined range, reduces the driving current supplied into the light source when the swivel angle of the spot beam exceeds the first predetermined range, and turns off the driving current supplied into the light source when the swivel angle exceeds a second predetermined range, wherein the turn on/off circuit turns off the driving current supplied to the light source when a forward vehicle is detected.

2. The vehicle lamp of claim 1, wherein when a target current is updated according to a variation of the swivel angle, the turn on/off circuit gradually changes the driving current of the light source to reach the updated target current.

3. The vehicle lamp of claim 2, wherein the turn on/off circuit changes the driving current of the light source to reach the updated target current for a transition time of 0.1 to 10 seconds.

4. The vehicle lamp of claim 3, wherein the controller is programmed to change the driving current of the light source to reach the updated target current for a transition time of 0.2 to 5 seconds when the target current is updated according to a swivel operation.

5. The vehicle lamp of claim 1, wherein the turn on/off circuit performs at least one of an analogue light control, which controls a current amount of a driving circuit, and a pulse width modulation (PWM) light control, which switches the driving circuit at a high speed so as to change a duty ratio thereof so as to control the driving current of the light source.

6. The vehicle lamp of claim 1, wherein the driving current of the light source is reduced by a function of $y=1/x$ or $y=e^{-x}$ as the swivel angle of the spot beam is increased.

7. The vehicle lamp of claim 1, wherein the controller includes a reverse amplifier that reversely amplifies an analogue voltage indicating the swivel angle and generates a light control signal of the analogue voltage.

* * * * *